(12) United States Patent
Muthukumar et al.

(10) Patent No.: US 7,263,692 B2
(45) Date of Patent: Aug. 28, 2007

(54) SYSTEM AND METHOD FOR SOFTWARE-PIPELINING OF LOOPS WITH SPARSE MATRIX ROUTINES

(75) Inventors: Kalyan Muthukumar, Bangalore (IN); Gautam Doshi, Santa Clara, CA (US); Dattatraya Kulkarni, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 679 days.

(21) Appl. No.: 10/612,724

(22) Filed: Jun. 30, 2003

(65) Prior Publication Data

US 2004/0268334 A1 Dec. 30, 2004

(51) Int. Cl.
*G06F 9/45* (2006.01)
(52) U.S. Cl. .................. 717/150; 717/157; 717/160
(58) Field of Classification Search ........ 717/124–161; 712/2–234; 703/14
See application file for complete search history.

(56) References Cited

U.S. PATENT DOCUMENTS

| | | | |
|---|---|---|---|
| 6,571,385 B1 | 5/2003 | Muthukumar et al. | 717/150 |
| 6,983,456 B2* | 1/2006 | Poznanovic et al. | 717/133 |
| 2001/0042187 A1* | 11/2001 | Tremblay | 712/2 |
| 2002/0112228 A1* | 8/2002 | Granston et al. | 717/155 |
| 2002/0129228 A1* | 9/2002 | Helder et al. | 712/234 |
| 2003/0171907 A1* | 9/2003 | Gal-On et al. | 703/14 |
| 2003/0237080 A1* | 12/2003 | Thompson et al. | 717/161 |
| 2004/0205718 A1* | 10/2004 | Reynders | 717/124 |

* cited by examiner

*Primary Examiner*—Meng-Al An
*Assistant Examiner*—Mark P. Francis
(74) *Attorney, Agent, or Firm*—Schwegman, Lundberg, Woessner & Kluth, P.A.

(57) ABSTRACT

A method that uses software-pipelining to translate programs, from higher level languages into equivalent object or machine language code for execution on a computer, including sparse arrays/matrices. In one example embodiment, this is accomplished by transforming sparse array matrix source code and software-pipelining the transformed source code to reduce recurrence initiation interval, decrease run time, and enhance performance.

25 Claims, 4 Drawing Sheets

```
UNPIPELINED (17 CYCLES PER ITERATION)
TIME - > 01234567890123456789012345678901234567889012345678901234567890
ITER01:  L--------A-------S
ITER02:            L--------A-------S
ITER03:                      L--------A-------S
ITER04:                                L----.....
```

320

```
UNROLLED (9 CYLES PER ITERATION)
TIME >   01234567890123456789012345678901234567889012345678901234567890
ITER01:  L--------A-------S
ITER02:       L--------A-------S
ITER03:           L--------A-------S
ITER04:                    L--------A-------S
ITER05:                        L--------A-------S
ITER06:                             L--------A-------S
```

330

```
SOFTWARE PIPELINED (5 CYLES PER ITERATION)
TIME->   01234567890123456789012345678901234567889012345678901234567890
ITER01:  L--------A-------S
ITER02:       L--------A-------S
ITER03:            L--------A-------S
ITER04:                 L--------A-------S
ITER05:                      L--------A-------S
ITER06:                           L--------A-------S
```

SYSTEM AND METHOD FOR
SOFTWARE-PIPELINING OF LOOPS WITH
SPARSE MATRIX ROUTINES

TECHNICAL FIELD OF THE INVENTION

This invention relates generally to compilers for computers, and more particularly to software-pipelining techniques for sparse matrix routines.

BACKGROUND OF THE INVENTION

Optimizing compilers are software systems for translation of programs from higher level languages into equivalent object or machine language code for execution on a computer. Optimization generally requires finding computationally efficient translations that reduce program run time. Such optimizations may include improved loop handling, dead code elimination, software-pipelining, improved register allocation, instruction prefetching, and/or reduction in communication cost associated with bringing data to the processor from memory.

Certain programs would be more useful if appropriate compiler optimizations are performed to decrease program run time. One such program element is a sparse matrix routine appropriate for matrices constituted mostly of zero elements. Instead of simultaneously storing in computer memory every element value, whether it is zero or non-zero, only integer indices to the non-zero elements, along with the element value itself, are stored. This has the advantage of greatly decreasing required computer memory, at the cost of increasing computational complexity. One such computational complexity is that array elements must now be indirectly accessed, rather than directly, i.e. the address of any array element cannot simply be determined as an offset from the base by the size of the array type, but rather the index of the array element must first be accessed and that index provides the needed offset from the base.

Common compiler optimizations for decreasing run time do not normally apply to such indirectly accessed sparse matrix arrays, or even straight line/loop code with indirect pointer references, making suitable optimization strategies for such types of code problematic. For example, statically disambiguating references to indirectly accessed arrays is difficult. A compiler's ability to exploit a loop's parallelism is significantly limited when there is a lack of static information to disambiguate stores and loads of indirectly accessed arrays.

A high level language loop specifies a computation to be performed iteratively on different elements of some organized data structures, such as arrays, structures, records and so on. Computations in each iteration typically translate into loads (to access the data), computations (to compute on the data loaded), and stores (to update the data structures in memory). Achieving higher performance often entails performing these actions, related to different iterations, concurrently. To do so, loads from many successive iterations often have to be performed before stores from current iterations. When the data structures being accessed are done so indirectly (either through pointer or via indirectly obtained indices) the dependence between stores and loads is dependent on data values of pointers or indices produced at run time. Therefore, at compile time there exists a "probable" dependence. Probable store-to-load dependence between iterations in a loop creates the ambiguity that prevents the compiler from hoisting the next iteration's loads and the dependent computations above the stores from the prior iteration(s). The compiler cannot assume the absence of such dependence, since ignoring such a probable dependence (and hoisting the load) will lead to compiled code that produces incorrect results.

Accordingly, conventional optimizing compilers must conservatively assume the existence of store-to-load (or vice versa) dependence even when there is no dependence. This is generally referred to as "memory dependence." Compilers are often not able to statically disambiguate pointers in languages such as "C" to determine whether they may point to the same data structures, which are generally referred to as "collisions." This prevents the most efficient use of speculation mechanisms that allow instructions from a sequential instruction stream to be reordered. Conventional out-of-order uniprocessors cannot reorder memory access instructions until the addresses have been calculated for all preceding stores. Only at this point will it be possible for out-of-order hardware to guarantee that a load will not be dependant upon any preceding stores.

A number of compilation techniques have been developed to improve the efficiency of loop computations by increasing instruction-level parallelism (ILP). One such method is sofiware-pipelining, which improves the performance of a loop by overlapping the execution of several independent iterations. The number of cycles between the start of successive iterations in software-pipelining is called the initiation interval, which is the greater of the resource initiation interval and the recurrence initiation interval. The resource initiation interval is based on the resource usage of the loop and the available processor resources. The recurrence initiation interval of the loop is based on the number of cycles in the dependence graph for the loop and the latencies of a processor. A higher instruction-level parallelism for the loop can be realized if the recurrence initiation interval of the loop is less than or equal to its resource initiation interval. Typically, this condition is not satisfied for loops whose computations involve sparse arrays/matrices. The body of such a loop typically starts with a load whose address in itself is an element of another array (called the index array) and ends with a store whose address is an element of the index array. In the absence of static information, the compiler does not know about the contents of the elements of the index array. Hence, it must assume that there is a loop-carried dependence edge from the store in one iteration to the load in the next iteration. This makes the recurrence initiation interval much higher than resource initiation interval.

Techniques to reduce recurrence initiation interval and improve instruction-level parallelism use methods, such as loop unrolling and data speculation to exploit parallelism within a loop body. However, loop unrolling does not exploit parallelism across the loop-closing back edge, i.e., there is parallelism only within an unrolled loop and not outside the unrolled loop. This generally results in poor instruction-level parallelism at the beginning and end of the loop body. In the case of data speculation, the technique assumes almost no collisions exist in the index array to achieve maximal performance within the loop body. However, performance gain from data speculation significantly diminishes if there are any collisions in the index array, resulting in a lower performance.

DETAILED DESCRIPTION

The various embodiments of the present invention provide methods, systems and programs for software-pipelining indirectly indexed arrays, such as sparse arrays/matrices so that recurrence initiation interval is reduced and thereby improving instruction-level parallelism. The technique is presented as a high level transformation of loops.

In the following detailed description of the embodiments of the present invention, reference is made to the accompanying drawings that form a part hereof, and in which are shown, by way of illustration, specific embodiments in which the present invention may be practiced. These embodiments are described in sufficient detail to enable those skilled in the art to practice the present invention, and it is to be understood that other embodiments may be utilized, and that changes may be made without departing from the scope of the present invention. The following detailed description is, therefore, not to be taken in a limiting sense, and the scope of the present invention is defined only by the appended claims.

The terms "sparse array" and "sparse matrix" are used interchangeably throughout the document.

Software-pipelining is a compilation technique that improves the performance of a loop by overlapping the execution of several independent iterations. This improves the utilization of available hardware resources by increasing the instruction-level parallelism. The number of cycles between the start of successive iterations is called the initiation interval, which is the greater of the resource initiation interval and the recurrence initiation interval. The resource initiation interval is based on the resource usage of the loop and the processor resources available. The recurrence initiation interval is based on the cycles in the dependence graph for the loop and the latencies of the processor.

A higher instruction-level parallelism for the loop can be realized if the recurrence initiation interval of the loop is less than or equal to its resource initiation interval. Typically, this condition is not satisfied for loops whose computation involves sparse arrays/matrices. The body of such a loop typically starts with a load whose address in itself is an element of another array (called the index array) and ends with a store whose address is an element of the index array. In the absence of static information, the compiler does not know about the contents of the elements of the index array. Hence, it must assume that there is a loop-carried memory dependence edge from the store in the current iteration to the load in the next iteration. This makes the recurrence initiation interval much higher than resource initiation interval.

The following example illustrates the problem of recurrence initiation interval being higher than resource initiation interval in a vectorizable loop requiring computation of sparse arrays/matrices:

First consider a loop performing computations on arrays that are directly accessed:

for (i=0; i<100; i++) a[i]=a[i]+c[i];

Each iteration in the above loop updates a different element of the array a and can therefore be executed in parallel with subsequent iterations.

Now consider the following loop, which represents sparse "Gather Vector Add," illustrates a common operation in sparse matrix computations:

for (i=0; i<100; i++) a[b[i]]=a[b[i]]+c[i];

The element of the array a, that is updated in an iteration i is determined by the value of the element b[i]. Wherein a[b[i]] is the sparse array and b [i] is the index array. Since the address of the store of a[b[M]] in iteration M cannot be disambiguated from the load of a[b[M+1]] in iteration (M+1), there is a "potential" loop-carried memory dependence edge from the store to the load. The recurrence cycle is caused by the following chain of dependence edges:

load (of a[b[i]])→add (to a[b[i]])→store (of a[b[i]])
→load (of a[b[i+1]])

This makes the recurrence initiation interval much higher (assuming typical operation latencies) than resource initiation interval for this loop.

Following is an example Intel® Itanium® architecture code generated for the above loop, without software-pipelining:

```
.b1_1:                      // 21 cycles per iteration
  { .mmi
    ld8     r9=[r32],8      // cycle 0: load b[i]
    ldfs    f8=[r34],4      // cycle 0: load c[i]
    nop.i   0 ;;
  } { .mmi
    shladd  r2=r9,2,r33 ;;  // cycle 2: address of (a[b[i]])
    ldfs    f7=[r2]         // cycle 3: load a[b[i]]
    nop.i   0 ;;
  } { .mfi
    nop.m   0
    fma.s   f6=f7,f1,f8     // cycle 12: add a[b[i]] + c[i]
    nop.i   0 ;;
  } { .mib
    stfs    [r2]=f6         // cycle 20: store add result a[b[i]]
    nop.i   0
    br.cloop.sptk .b1_1 ;;  // cycle 20:
```

The above loop has a resource initiation interval of 2 cycles (4 memory operations) and a recurrence initiation interval of 17 cycles (load latency of 9 cycles, and fma-st latency of 8 cycles) when using a processor such as the Intel® Itanium® processor.

One possible solution for the compiler to reduce recurrence initiation interval is to use the technique of data speculation, in processor architectures such as the Intel® Itanium® architecture, which provides a mechanism for the compiler to break, possible but unlikely, store-to-load memory dependencies. It is possible to efficiently software-pipeline the above example loop using data speculation. Such a loop will have a scheduled initiation interval of 3 cycles, since a chk. a instruction will be introduced into the loop to recover from a speculation failure (i.e., when the "possible" dependence is a "true" dependence). The performance of the loops with and without data speculation when using a processor such as the Intel® Itanium® processor is typically much better with data speculation than without it, for example as much as ⅕ as many cycles for the former as compared to the latter.

However, it is generally not known how often the index array elements collide, i.e., b [i]==b [j] for i !=j (i.e., the possible dependence becomes a true dependence). If the chk. a operates at least 15 times in this loop (either because of true collisions in the index array b [i], or even because of false Advanced Load Address Table (ALAT) conflicts, which is a conflict detection structure in the Intel® Itanium® processor), the performance gain due to data speculation will disappear and the resultant performance will be actually be worse than that of the software-pipelined loop without data speculation. This is because, for example, the penalty of a chk. a instruction miss is about 100 cycles in the Intel® Itanium® processor.

One possible prior-art solution to this problem relies on dynamic run time disambiguation of the index array elements. This technique uses unrolling and results in reducing the recurrence initiation interval from about 17 cycles to 9 cycles. The unrolling techique is accomplished by generating compoled code that unrolls a few iterations of the loop and dynamically detects store to load dependencies at run time. The dependence check code is used to compinsate for the lack of static information to disambiguate between stores and loads of indirectly accessed arrays.

However, using embodiments of the present invention for sofiware-pipelining of such loops described above can further reduce the recurrence initiation interval from 9 cycles to about 5 cycles. This can translate into a performance gain for such loops over the above-described unrolling technique. This is because software-pipelining according to the embodiments of the present invention exploits parallelism within the loop body, as well as across the loop-closing back edge, which the unrolling technique does not exploit. According to certain embodiments of the invention, there is provided dynamic run time disambiguation of the elements of an index array using otherwise-idle issues slots in a software-pipelining schedule. The following outlines some of the principles of the embodiments of the present invention:

1. In iteration M, the values of b[M−1], b[M−2], and b[M−3] are held in rotating registers. Similarly, the values of a[b[M−1]], a[b[M−2]], and a[b[M−3]] are also held in rotating registers.
2. The value of a[b[M]] is loaded into a separate register. If b[M] is equal to any of b[M−1], b[M−2], or b[M−3], then the value of a[b[M−1]], a[b[M−2]], or a[b[M−3]] is respectively used instead to compute the new value of a[b[M]]. Otherwise the value of a[b[M]] that was just loaded is used.
3. The worst-case scenario can be that b[M]==b[M−1]. In such a case, the just computed value of a[b[M−1]] is used to compute the new value of a[b[M]]. Hence the recurrence initiation interval of this loop is 5 cycles, since the latency of one Floating Point Multiply Add (FMA) instruction to another FMA is 5 cycles for a processor such as a processor having the Intel® Itanium® architecture.

Figure 1:
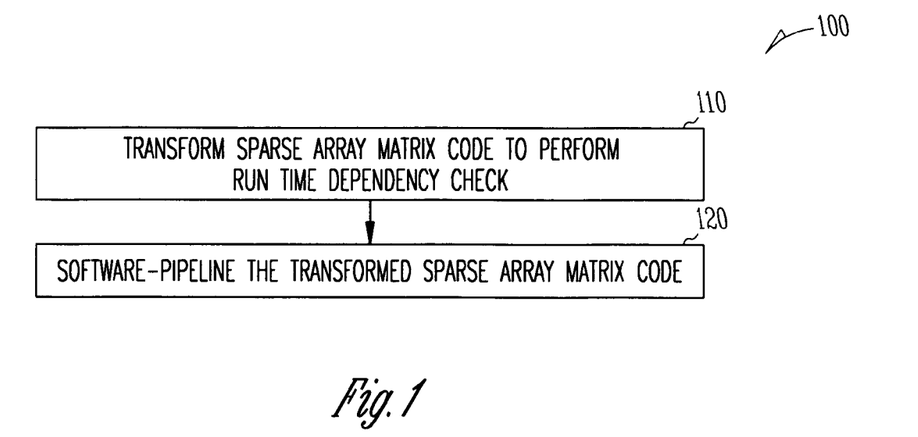
FIG. 1 is a flowchart illustrating a method and program for software-pipelining sparse arrays/matrices, in accordance with one embodiment of the present invention.

FIG. 1 illustrates a first example embodiment of a method 100 according to the present invention. In this example embodiment, the objective is to parallelize execution of subsequent independent iterations in an indirectly accessed sparse array matrix using software-pipelining to increase instruction-level parallelism and decrease initiation interval.

At 110, sparse array matrix code is transformed to perform a run time dependency check using a predetermined number of prior computed values. The following example illustrates transformed code for the source code illustrated earlier:

```
b0 = −1; // Initialize to an illegal value for b[i]
b1 = −1; // ditto
b2 = −1; // ditto
for (i = 0; i < 100; i++) {
    b3 = b[i];
    c3 = c[i];
    if (b3 == b2) {
        a3 = a2 + c3;
    } else if (b3 == b1) {
        a3 = a1 + c3;
    } else if (b3 == b0) {
        a3 = a0 + c3;
    } else {
        a3 = a[b3] + c3;
    }
    a[b[i]] = a3;
    a0 = a1; a1 = a2; a2 = a3; // mcopy instructions
    b0 = b1; b1 = b2; b2 = b3; // mcopy instructions
}
```

At 120, the above transformed sparse array matrix code is software-pipelined by performing the run time dependency check in a current iteration using the predetermined number of prior computed values. In some embodiments, the transformed source code will be software-pipelined by marking the loop-carried memory dependence edge from the store of a[b[i]] to the load of a[b[i]] as having a distance of 4, since we explicitly keep the values of a[b[i−3]], a[b[i−2]], and a[b[i−1]] in a0, a1 and a2, respectively. This transformation can be envisioned as virtually unrolling the loop by a factor of 3.

Software-pipelining the above example transformed code results in a software-pipelined loop with an initiation interval of 5 cycles. As mentioned above, software-pipelining with data speculation for this loop will give us an initiation interval of 3 cycles. However, this is under ideal conditions, when there are no real or false ALAT conflicts. In this loop with 100 iterations, even when there are just 2 ALAT conflicts (again assuming the penalty of a chk. a miss to be 100 cycles), the real initiation interval of the software-pipelining loop with data speculation will be 5 cycles. Then the performance of the loop with the novel method will equal that of the loop with software-pipelining data speculation. When there are 3 or more ALAT conflicts, the real initiation interval of the software-pipelining loop with data speculation will be 6 cycles or more, and this example embodiment can result in improved performance.

In the absence of additional information, the software-pipelining embodiments of the invention may perform better than data speculation, even if the probability of the loop-carried store-to-load dependence is very small.

In some embodiments, resource initiation interval is based on resource usage of the dependence loop and available processor resources. Also in these embodiments, recurrence initiation interval is based on the number of cycles in the dependence graph for the loop and latencies of the processor.

Further, as described above, various example embodiments of the present invention provide for reducing the recurrence initiation interval in sparse arrays/matrices to optimize translation of programs and reduce run time. In addition, the above-described embodiments increase instruction-level parallelism and reduce initiation interval using software-pipelining to enhance the performance of computations that involve sparse arrays/matrices.

Furthermore, the various embodiments described above can be applied to undisambiguated pointer stores from N prior iterations to current loads that otherwise cause conservative compiles to serialize. Following are some of the examples of vectorizable loops requiring the undisambiguated pointer stores:

```
1. for (i = 0; I < 100; i++)
     a[b[i]] = a[d[i]] + c[i];
2. for (i = 0; I<100; i++)
     a[*b] = a[*b] + c[i];
        b++;
    }
3. for (i = 0, I<100; i++)
     a[*b++] = a[*d++] + c[i];
    }
4. for (i = 0; I < 100, i++) {
     s    += a[b[i]] + c1[i];
     a[b[i]] = r    + c2[i];
    }
```

Figure 2:
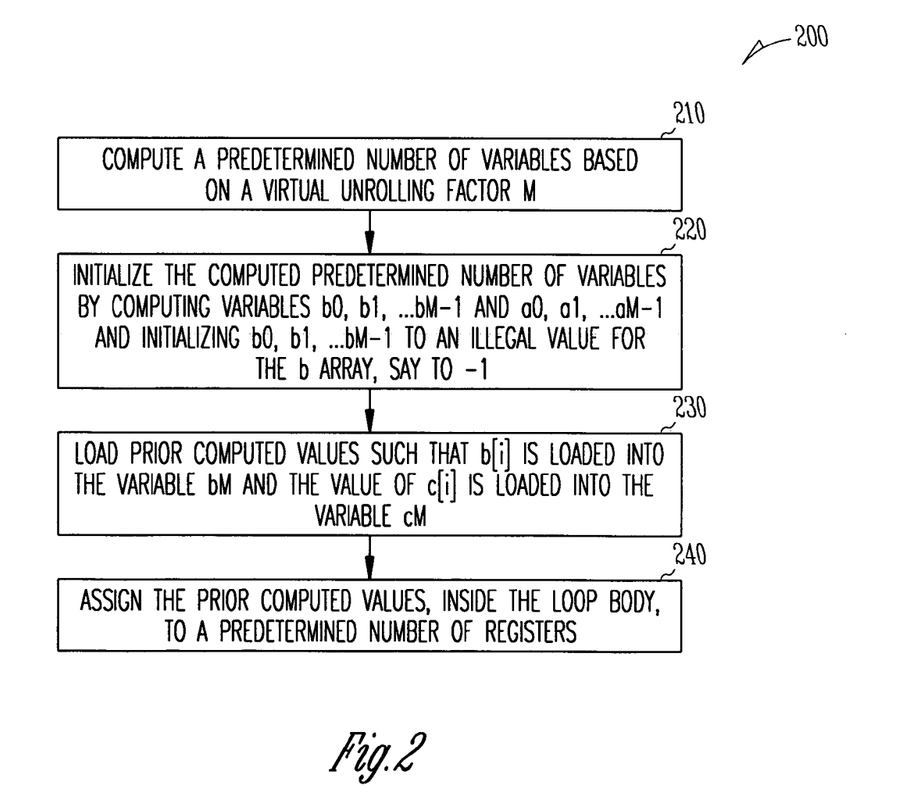
FIG. 2 is a flowchart illustrating a method and program for software-pipelining transformed sparse array matrix code, in accordance with one embodiment of the present invention.

Referring now to FIG. 2, there is illustrated an example embodiment 200 of software-pipelining transformed sparse array matrix code illustrated at 110 in FIG. 1. At 210, this example embodiment 200 computes a predetermined number of variables based on a virtual unrolling factor. In some embodiments, the predetermined number of variables is computed using the equation:

M=Ceiling (Recurrence II/FMA Latency) −1 where M is the virtual unrolling factor, i.e., the number of previous iterations from which the computed values have been temporarily held in registers.

For the above-transformed source code and the example given previously above, using for example the Intel® Itanium® processor, the recurrence initiation interval is 17 cycles and the FMA latency is 5. Using the above equation, the predetermined number of variables, i.e. the virtual unrolling factor M, is 3.

At 220, the computed predetermined number of variables is initialized. In the example previously given above, the variables $b_0, b_1, \ldots b_{M-1}$ and $a_0, a_1, \ldots a_{M-1}$ are computed and $b_0, b_1, \ldots b_{M-1}$ are initialized to an illegal value for the b array, say to −1. In these embodiments, initialization is done outside the loop.

At 230, inside the loop body, prior computed values are loaded into the predetermined number of variables. In the running example embodiment, the value of b[i] is loaded into the variable $b_M$ and the value of c[i] is loaded into the variable $c_M$.

At 240, again inside the loop body, the prior computed values are assigned to a predetermined number of registers. In the running example embodiment, a nested, if-then-else statement is created inside the loop. If ($b_{M-1} = b_M$), then the variable $a_M$ is assigned the value of the right hand side (RHS) computed using the value of $a_{M-1}$ rather than the value of $a[b_M]$. Similarly, the nested if statement continues by comparing ($b_{M-2} = b_M$). If this is true, then the variable $a_M$ is assigned the value of the RHS computed using the value of $a_{M-2}$ rather than the value of $a[b_M]$. This is performed until the comparison ($b_0 = b_M$) is complete. When none of the above comparisons are true (the final else clause in the nested if-then-else statement), that means the current index array element is not equal to any of the previous (M−1) elements. In this case, the variable $a_M$ is assigned the value of the RHS computed using the value of $a[b_M]$.

In some embodiments, the value in $a_M$ is stored in the array element a[b[i]]. A series of moves (annotated as "mcopies") are created at the end of the loop: $b_0=b_1$; $b_1=b_2$; ... $b_{M-1}=b_M$ and $a_0=a_1$; $a_1=a_2$; ... $a_{M-1}=a_M$. These move operations will be performed by register rotation (and hence will be eliminated) by the software-pipelining phase. The loop-carried memory dependence is changed from a distance of 1 to a distance of (M+1).

As described above, multiple iterations are software-pipelined to reduce recurrence initiation interval, perhaps by overlapping execution of dependence loop instructions in multiple dependent iterations in the sparse arrays/matrices. In these embodiments, software-pipelining includes parallelizing the multiple iterations using the prior computed values to reduce recurrence initiation interval based on the run time dependency check. In these embodiments, dependence loop body instructions are parallelized between the subsequent independent iterations. Loop body instructions are based on clock cycles. The above-described run time dependency check and parallelizing the dependence loop instruction improves the efficiency of loop computations by increasing the instruction-level parallelism.

Although flowcharts 100 and 200 include acts that are arranged serially in the exemplary embodiments, other embodiments of the present invention may execute two or more acts in parallel, using multiple processors or a single processor organized as two or more virtual machines or sub-processors. Moreover, still other embodiments may implement the acts as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 3:
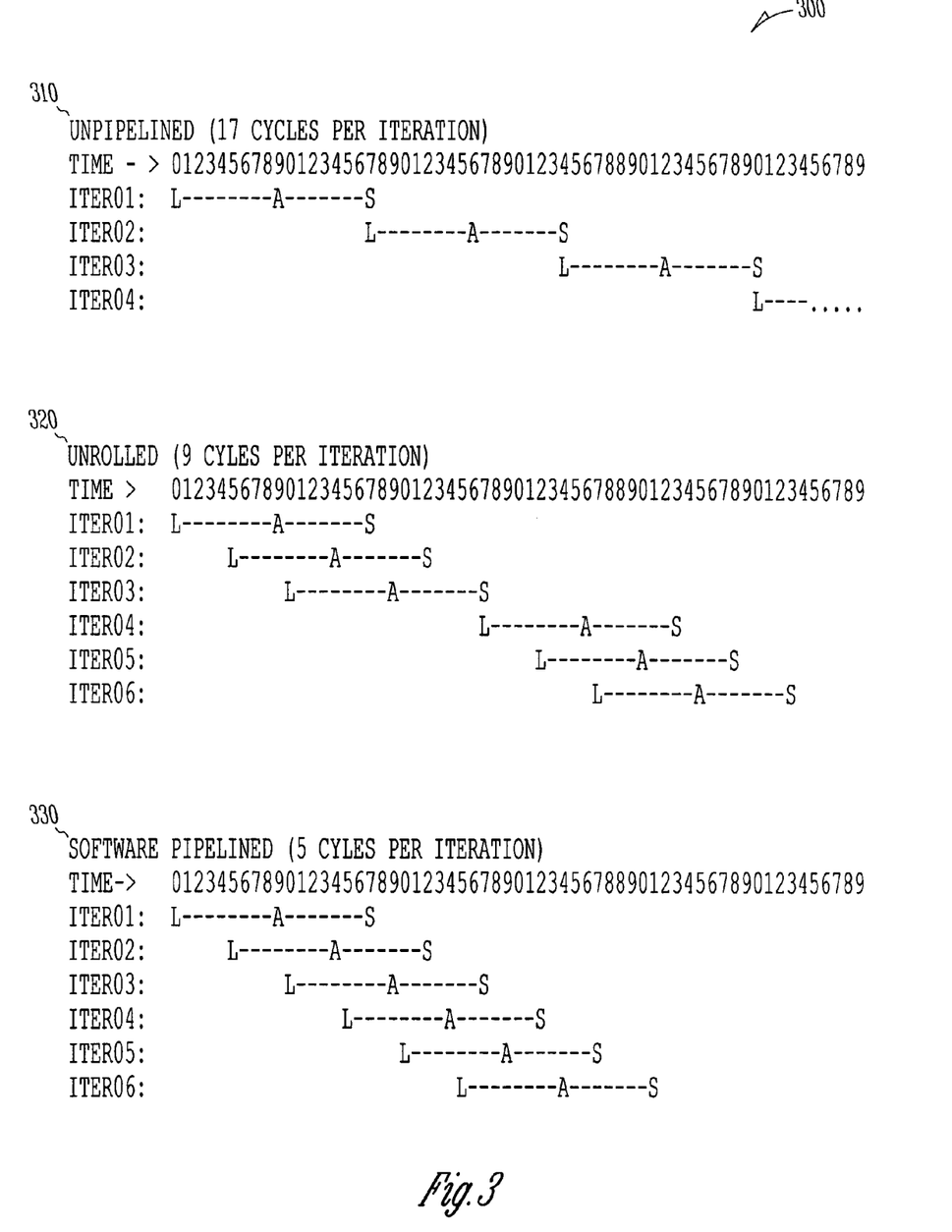
FIG. 3 is a graph illustrating reduction of recurrence initiation interval using software-pipelining, in accordance with the one embodiment of the present invention.

Referring now to FIG. 3, a graph 300, in various example embodiments, illustrates the recurrence initiation interval required for an unpipelined sparse array matrix code 310, an unrolled sparse array matrix transformed code 320, and a software-pipelined sparse array matrix transformed code 330. It can be seen in FIG. 3 that the recurrence initiation interval reduces from 17 cycles per iteration requirement to 5 cycles per iteration requirement when using the methods, systems, and programs according to the present invention with, for instance, an Intel® Itanium® processor. In this example embodiment, the software-pipelined sparse array matrix transformed code 330 requires only 5 cycles per iteration and 5 stages. It can be seen in FIG. 3 that the software-pipelined sparse array matrix transformed code 330 provides a significant improvement, by reducing the recurrence initiation interval, over the unpipelined sparse array matrix code 310 and the unrolled sparse array matrix transformed code 320.

Figure 4:
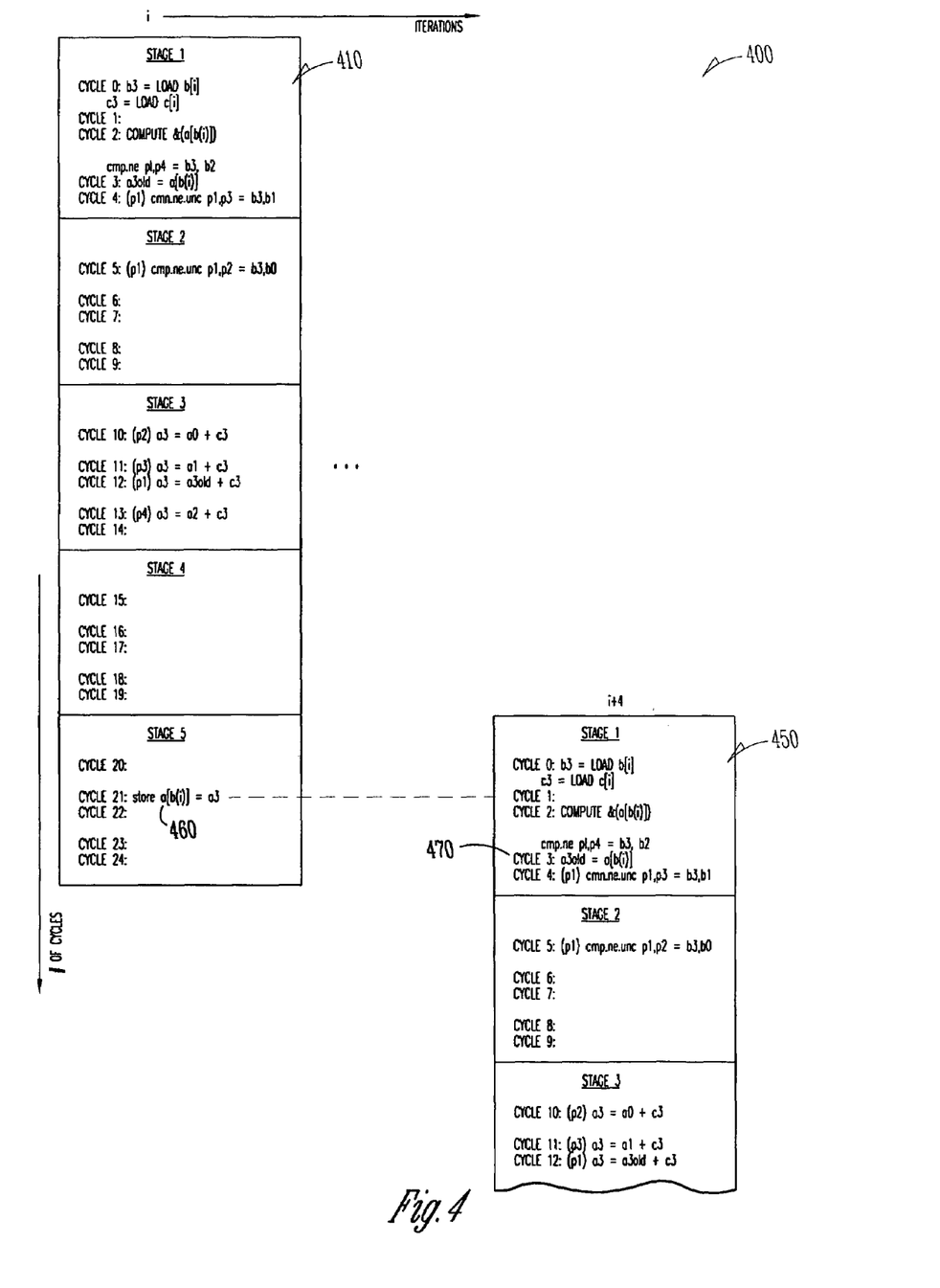
FIG. 4 is a graph illustrating software-pipelining of the transformed code and performing run time dependency checks on current and subsequent iterations to reduce recurrence initiation interval, in accordance with one embodiment of the present invention.

Referring now to FIG. 4, a graph illustrates an example embodiment 400 of the software-pipelined version of the transformed code and performing run time dependency checks on current and subsequent iterations to reduce recurrence initiation interval. The graph in FIG. 4 shows iterations on the x-axis and cycles on the y-axis. FIG. 4 illustrates an example 5 stage software-pipeline that provides a continuous overlap between subsequent iterations. The columns 410 and 450 show computations for iterations i and i+4, respectively.

In the first column 410, i.e., the first iteration, the values a0, a1, and a2 correspond to the stored values of a[b[i−3]], a[b[i−2]], and a[b[i−1]], respectively. Similarly, the values of b0, b1, and b2 correspond to b[i−3], b[i−2], and b[i−1], respectively. As we go from iteration i to i+1, the value of a1 moves to a0, the value of a2 moves to a1, and the value of a3 moves to a2. Similarly, the value of b1 moves to b0, and the value of b2 moves to b1, and the value of b3 moves to b2, as we go from iteration i to i+1. These transfers are virtual and are achieved by register rotation in a processor, such as an Intel® Itanium® processor and such transfers can also be achieved by move instructions in other processor architectures that do not provide register rotation.

The loop-carried memory dependence from the store of a[b[i]] to the load of a[b[i+1]] in the next iteration no longer exists. This is because the stored values of a[b[i−3]], a[b[i−2]], and a[b[i−1]] are remembered. Because of this transformation, only the loop-carried memory dependence from the store of a[b[i]] 460 in the first column 410 to the load of a[b[i+4]] 470 in the fifth column 450 exist i.e. the loop-carried memory dependence is now across 4 iterations. FIG. 4 shows the need for 5 iterations, i.e., between the first iteration and the fifth iteration the dependents are taken care of in the second through fourth iterations. The load of a[b[i+4]] in the fifth iteration is obtained from the store of a[b[i]] in the first iteration. That is why five iterations are needed in the software-pipelining of this example embodiment of the present invention.

This technique reduces recurrence initiation interval of sparse arrays/matrices by virtual unrolling. i.e., keeps the values computed in previous iterations in rotating registers and uses them if needed as described above. Some embodiments of the invention exploit features, such as predication, rotating registers, and special branches for software-pipelining, provided in a processor such as, but not limited to, those of the Intel® Itanium® processor family architecture.

Various embodiments of the present invention can be implemented in software, which may be run in the environment shown in FIG. 5 (to be described below) or in any other suitable computing environment. The embodiments of the present invention are operable in a number of general-purpose or special-purpose computing environments. Some computing environments include personal computers, general-purpose computers, server computers, hand-held devices (including, but not limited to, telephones and personal digital assistants of all types), laptop devices, multiprocessors, microprocessors, set-top boxes, programmable consumer electronics, network computers, minicomputers, mainframe computers, distributed computing environments and the like to execute code stored on a computer-readable medium. The embodiments of the present invention may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Figure 5:
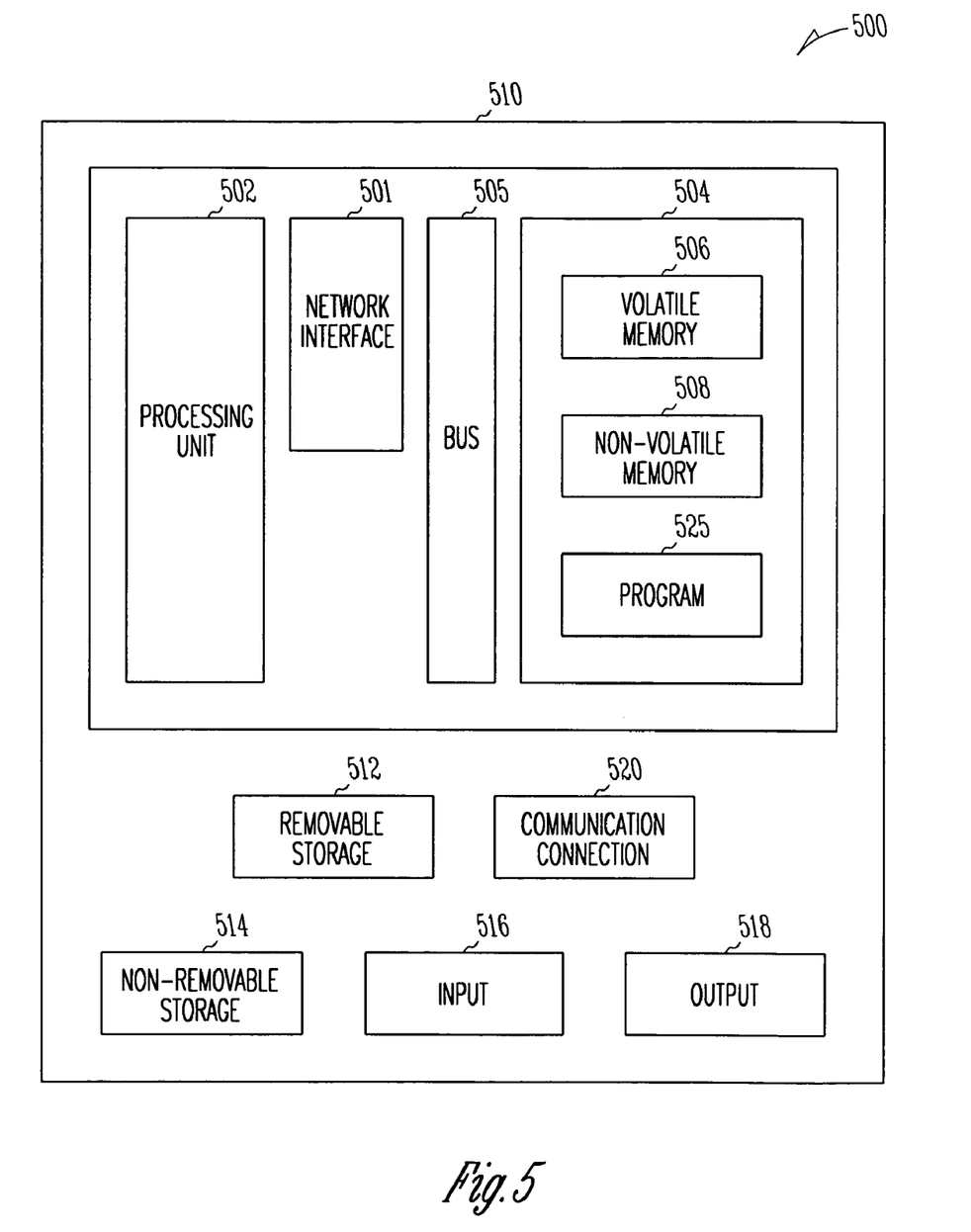
FIG. 5 is an example of a suitable computing environment for implementing embodiments of the present invention.

FIG. 5 shows an example of a suitable computing system environment for implementing embodiments of the present invention. FIG. 5 and the following discussion are intended to provide a brief, general description of a suitable computing environment in which certain embodiments of the inventive concepts contained herein may be implemented.

A general computing device, in the form of a computer 510, may include a processing unit 502, memory 504, removable storage 512, and non-removable storage 514. Computer 510 additionally includes a bus 505 and a network interface (NI) 501.

Computer 510 may include or have access to a computing environment that includes one or more input elements 516, one or more output elements 518, and one or more communication connections 520 such as a network interface card or a USB connection. The computer 510 may operate in a networked environment using the communication connection 520 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 504 may include volatile memory 506 and non-volatile memory 508. A variety of computer-readable media may be stored in and accessed from the memory elements of computer 510, such as volatile memory 506 and non-volatile memory 508, removable storage 512 and non-removable storage 514.

Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present invention may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 502 of the computer 510. For example, a computer program 525 may comprise machine-readable instructions capable of software-pipelining sparse array matrix code according to the teachings and herein described embodiments of the present invention. In one embodiment, the computer program 525 may be included on a CD-ROM and loaded from the CD-ROM to a hard drive in non-volatile memory 508. The machine-readable instructions cause the computer 510 to offload the received electronic packets to one of the available methods and programs according to some embodiments of the present invention.

The various embodiments of the compilers and methods and systems of translation of sparse arrays/matrices described herein are applicable generically to any computationally efficient translations that reduce program run time, and the embodiments described herein are in no way meant to limit the applicability of the present invention. In addition, the techniques of the various example embodiments are useful for translation of programs from higher level languages into equivalent object or machine language code, any hardware implementations, or translation of programs, software, firmware and algorithms. Accordingly, the methods, systems and articles of manufacture of the present invention are applicable to such applications and are in no way limited to the embodiments described herein.

What is claimed is:

1. A method comprising:
performing a run time dependency check during a current iteration using prior computed values obtained from a predetermined number of previous adjacent iterations in a sparse array matrix;
parallelizing dependent loop instructions between the current iteration and subsequent multiple iterations by using the computed values to make the dependence loop instructions into independent loop iterations so as to increase instruction-level parallelism and reduce recurrence initiation interval in the current iteration as a function of the run time dependency check during the current iteration; and
computing a virtual unrolling factor using the recurrence initiation interval and latency in number of cycles of a floating point multiply add operation in the sparse array matrix, wherein the prior computed values are based on virtual unrolling using the computed virtual unrolling factor.

2. The method of claim 1, wherein the virtual unrolling factor includes three previous iterations.

3. The method of claim 1, further comprising:
assigning the prior computed values to a predetermined number of adjacent registers.

4. The method of claim 1, further comprising:
performing register rotation to include computed values obtained from the current iteration; and
repeating performing the run time dependency check and parallelizing the dependence loop instructions to increase the instruction-level parallelism and reduce the recurrence initiation interval in a next iteration.

5. A method comprising:
transforming sparse array matrix code to perform a run time dependency check using a predetermined number of prior computed values;
software-pipelining the transformed sparse array matrix code to perform the run time dependency check in a current iteration using the predetermined number of prior computed values;
software-pipelining to parallelize multiple iterations by overlapping execution of dependence loop instructions in the prior computed values to reduce recurrence initiation interval in the sparse array matrix based on the run time dependency check; and
computing a virtual unrolling factor using the recurrence initiation interval and latency in number of cycles of a floating point multiply add operation in the sparse array matrix, wherein the predetermined number of prior computed values is based on virtual unrolling using the computed virtual unrolling factor.

6. The method of claim 5, wherein software-pipelining the transformed sparse array matrix code comprises:
computing a predetermined number of variables based on the virtual unrolling factor;
initializing the computed predetermined number of variables;
loading the prior computed values into the predetermined number of variables;
assigning the prior computed values to a predetermined number of substantially adjacent registers; and
software-pipelining using the assigned prior computed values.

7. The method of claim 6, further comprising:
performing register rotation to include computed values obtained from the current iteration; and
repeating the software-pipelining and using the register rotated computed values to reduce the recurrence initiation interval in a next iteration.

8. The method of claim 7, wherein the computed values obtained from the predetermined number of prior adjacent iterations are based on virtual unrolling by using the virtual unrolling factor.

9. The method of claim 8, wherein the virtual unrolling factor is three.

10. A method comprising:
transforming loop computations from a predetermined number of prior adjacent iterations in sparse arrays/matrices to current loads code to perform a run time dependency check using a predetermined number of prior computed values;
software-pipelining the transformed loop computations from the predetermined number of prior adjacent iterations to perform a run time dependency check in a current iteration using the predetermined number of prior computed values;
parallelizing the loop computations using the prior computed values; and
computing a virtual unrolling factor using recurrence initiation interval and latency in number of cycles of a floating point multiply add operation in the sparse arrays/matrices, wherein the predetermined number of prior computed values is based on virtual unrolling using the computed virtual unrolling factor.

11. The method of claim 10, wherein the predetermined number of prior computed values is obtained from the predetermined number of prior adjacent iterations based on the virtual unrolling factor.

12. The method of claim 11, wherein the virtual unrolling factor is three.

13. The method of claim 10, wherein parallelizing the computations using the prior computed values comprise:
overlapping execution of dependence loop instructions in multiple dependent iterations in the sparse arrays/matrices using the software-pipelining.

14. The method of claim 10, further comprising:
assigning the prior computed values to a predetermined number of adjacent register.

15. The method of claim 14, further comprising:
performing register rotation to include computed values obtained from the current iteration.

16. An article comprising a computer-readable medium which stores computer-executable instructions, the instructions causing a computer to:
perform a run time dependency check during a current iteration using prior computed values obtained from a predetermined number of previous adjacent iterations in a sparse array matrix;
parallelize dependent loop instructions between the current and subsequent multiple iterations by using the computed values to make the dependence loop instructions into independent loop iterations; and
compute a virtual unrolling factor using recurrence initiation interval and latency in number of cycles of a floating point multiply add operation in the sparse array matrix, wherein the prior computed values are based on virtual unrolling using the computed virtual unrolling factor.

17. The article comprising a computer-readable medium which stores the computer executable instruction of claim 16, wherein instructions causing a computer to perform the run time dependency check further comprise instructions to:
- transform loop computations from a predetermined number of prior adjacent iterations in sparse arrays/matrices to current loads code to perform a run time dependency check using a predetermined number of prior computed values; and
- software-pipeline the transformed loop computations from the predetermined number of prior adjacent iterations to perform a run time dependency check in a current iteration using the predetermined number of prior computed values.

18. The article comprising a computer-readable medium which stores the computer-executable instructions of claim 16, wherein the instructions further cause the computer to assign the prior computed values to a predetermined number of adjacent register.

19. The article comprising a computer-readable medium which stores the computer-executable instructions of claim 18, wherein the instructions further cause the computer to perform register rotation to include computed values obtained from the current iteration.

20. A system comprising:
- a bus;
- a processor coupled to the bus;
- a memory coupled to the processor;
- a network interface device;
- wherein execution of loop computations in indirectly accessed sparse arrays/matrices by the processor uses software-pipelining to increase instruction-level parallelism and decrease initiation interval by performing:
- transforming loop computations from a predetermined number of prior adjacent iterations in sparse arrays/matrices to current loads code to perform a run time dependency check using a predetermined number of prior computed values;
- software-pipelining the transformed loop computations from the predetermined number of prior adjacent iterations to perform a run time dependency check in a current iteration using the predetermined number of prior computed values;
- parallelizing the loop computations using the prior computed values to reduce recurrence initiation interval in the undisambiguated pointer stores from the predetermined number of prior adjacent iterations to current loads code based on the run time dependency check; and
- computing a virtual unrolling factor using the recurrence initiation interval and latency in number of cycles of a floating point multiply add operation in the sparse arrays/matrices, wherein the predetermined number of prior computed values is based on virtual unrolling using the computed virtual unrolling factor.

21. The system of claim 20, wherein the processor further assigns the prior computed values to a predetermined number of adjacent register.

22. The system of claim 21, wherein the processor further performs register rotation to include computed values obtained from the current iteration.

23. An article comprising a computer-readable medium which stores computer-executable instructions, the instructions causing a computer to:
- perform a run time dependency check during a current iteration using prior computed values obtained from a predetermined number of previous adjacent iterations in a sparse array matrix, the performance of the run time dependency check including instructions to cause the computer to:
  - transform loop computations from a predetermined number of prior adjacent iterations in sparse arrays/matrices to current loads code to perform a run time dependency check using a predetermined number of prior computed values; and
  - software-pipeline the transformed ioop computations from the predetermined number of prior adjacent iterations to perform a run time dependency check in a current iteration using the predetermined number of prior computed values; and
- parallelize dependent loop instructions between the current and subsequent multiple iterations by using the computed values to make the dependence loop instructions into independent loop iterations.

24. The article comprising a computer-readable medium which stores the computer-executable instructions of claim 23, wherein the instructions further cause the computer to assign the prior computed values to a predetermined number of adjacent register.

25. The article comprising a computer-readable medium which stores the computer-executable instructions of claim 24, wherein the instructions further cause the computer to perform register rotation to include computed values obtained from the current iteration.

* * * * *

UNITED STATES PATENT AND TRADEMARK OFFICE
CERTIFICATE OF CORRECTION

PATENT NO. : 7,263,692 B2  Page 1 of 1
APPLICATION NO. : 10/612724
DATED : August 28, 2007
INVENTOR(S) : Muthukumar et al.

It is certified that error appears in the above-identified patent and that said Letters Patent is hereby corrected as shown below:

In column 11, line 12, in Claim 1, delete "ioop" and insert -- loop --, therefor.

In column 13, line 2, in Claim 17, delete "computer executable" and insert -- computer-executable --, therefor.

In column 14, line 28, in Claim 23, delete "ioop" and insert -- loop --, therefor.

Signed and Sealed this

Twenty-seventh Day of May, 2008

JON W. DUDAS
*Director of the United States Patent and Trademark Office*